US008433666B2

(12) United States Patent
Matsumura

(10) Patent No.: US 8,433,666 B2
(45) Date of Patent: Apr. 30, 2013

(54) LINK INFORMATION EXTRACTING APPARATUS, LINK INFORMATION EXTRACTING METHOD, AND RECORDING MEDIUM

(75) Inventor: Norikazu Matsumura, Tokyo (JP)

(73) Assignee: NEC Biglobe, Ltd., Tokyo (JP)

( * ) Notice: Subject to any disclaimer, the term of this patent is extended or adjusted under 35 U.S.C. 154(b) by 937 days.

(21) Appl. No.: 12/536,781

(22) Filed: Aug. 6, 2009

(65) Prior Publication Data

US 2010/0049688 A1 Feb. 25, 2010

(30) Foreign Application Priority Data

Aug. 21, 2008 (JP) .................................. 2008-212923

(51) Int. Cl.
G06F 17/00 (2006.01)
G06N 5/00 (2006.01)

(52) U.S. Cl.
USPC ............................................................. 706/45

(58) Field of Classification Search .................. 706/12, 706/45, 62
See application file for complete search history.

(56) References Cited

U.S. PATENT DOCUMENTS

| | | | | |
|---|---|---|---|---|
| 8,041,721 | B2* | 10/2011 | Tago | 707/749 |
| 8,117,195 | B1* | 2/2012 | Dave et al. | 707/730 |
| 8,150,779 | B1* | 4/2012 | Gauvin | 726/25 |
| 2008/0071204 | A1* | 3/2008 | Schuba et al. | 709/224 |
| 2008/0091708 | A1* | 4/2008 | Caldwell | 707/102 |
| 2008/0114755 | A1* | 5/2008 | Wolters et al. | 707/5 |
| 2008/0275833 | A1* | 11/2008 | Zhou et al. | 706/45 |
| 2008/0301139 | A1* | 12/2008 | Wang et al. | 707/7 |
| 2009/0006371 | A1* | 1/2009 | Denoue et al. | 707/5 |
| 2009/0132901 | A1* | 5/2009 | Zhu et al. | 715/206 |

FOREIGN PATENT DOCUMENTS

JP 2008-033599 A 2/2008

OTHER PUBLICATIONS

Kolari, P. et al. "Detecting Spam Blogs: A Machine Learning Approach". AAAI. 2006. pp. 1351-1356.*
Lin, Y-R. et al. "The Splog Detection Task and a Solution Based on Temporal and Link Properties". 2006. pp. 1-14.*
Salvetti, F. et al. "Weblog Classification for Fast Splog Filtering: A URL Language Model Segmentation Approach". Proceedings of the Human Language Technology Conference of the North American Chapter of the Association for Computational Linguistics, Jun. 2006. pp. 137-140.*
Japanese Office Action for JP2008-212923 dated May 11, 2010.

(Continued)

Primary Examiner — Jeffrey A Gaffin
Assistant Examiner — Benjamin Buss

(57) ABSTRACT

A storage unit stores first link information classified into a particular type. A take-in unit takes in a plurality of pieces of electronic information. A classifier unit classifies each piece of the electronic information taken in by the take-in unit into first electronic information which describes the first link information and second electronic information which does not describe the first link information. A generator unit generates third link information based on second link information when the first electronic information describes the second link information that is different from the first link information. An output unit generates possibility information indicative of a possibility that the third link information is classified into a particular type, based on the third link information and at least the first or second electronic information, and outputs the possibility information and the third link information in association with each other.

12 Claims, 6 Drawing Sheets

OTHER PUBLICATIONS

K. Nakamura et al., "Proposal for Detection Method of Blog Spam Based on Categorization and Time Series information", Journal of the Information Processing Society, Japan, the information Processing Society, vol. 49, No. 3, Mar. 15, 2008, pp. 1119-1130, English Abstract Only.

K. Ishida, "Spam Blog Estimation and Extraction", the Database Society of Japan Letters, Japan, the Database Society of Japan, vol. 6, No. 4, Mar. 21, 2008, pp. 37-40, Entirely in Japanese. No English portion provided.

Y. Sato et al., "Collecting/Classifying Spolgs and Developing Splog Data Set based on Time Series Characteristics of Keywords", Transactions of the 19th Data Engineering Workshop of the Institute of Electronics, Information and Communication Engineers, Japan, the Data Engineering Research Community of the Institute of Electronics, Information and Communication of Engineers, Apr. 7, 2008, pp. 1-8, English Abstract Only.

* cited by examiner

Fig.2

| BLOG IDENTIFICATION INFORMATION | BLOG |
|---|---|
| BLOG A | SPLOG |
| BLOG B | SPLOG |
| BLOG C | SPLOG |
| BLOG D | NORMAL |
| BLOG E | NORMAL |
| BLOG F | NORMAL |
| BLOG G | NORMAL |
| ⋮ | ⋮ |

Fig.4

```
<HTML>
<HEAD>
<TITLE>BLOG PAGE A</TITLE>
</HEAD>
<BODY>
. . .
<A href="http://domein1/dir1/dir2/dir3/">LINKED PAGE B</A>
. . .
<A href="http://domein2/dir4/dir5/dir6/">LINKED PAGE C</A>
. . .
</BODY>
</HTML>
```

Fig.5

```
. . .
domain1/dir1
domain3/dir7/dir8
. . .
```

Fig.6

| RANK | DECOMPOSED URL | SCORE |
|---|---|---|
| FIRST | domain2/dir4 | 1.0 |
| ... | | |
| THIRD | domain4/dir9 | 0.7 |
| ... | | |
| SEVENTH | domain2 | 0.5 |
| ... | | |

Fig.7

...
domain4/dir9
...

Fig.8

| RANK | DECOMPOSED URL | SCOR |
|---|---|---|
| FIRST | domain2/dir4 | 1.0 |
| ... | | |
| SIXTH | domain2 | 0.5 |
| ... | | |

Fig.9

```
RANK    DECOMPOSED URL    SCORE
FIRST   domain2/dir4      1.0
...
```

Fig.10

```
...
domain1/dir1
domain3/dir7/dir8
...
domain2/dir4
...
```

LINK INFORMATION EXTRACTING APPARATUS, LINK INFORMATION EXTRACTING METHOD, AND RECORDING MEDIUM

This application is based upon and claims the benefit of priority from Japanese patent application No. 2008-212923, filed on Aug. 21, 2008, the disclosure of which is incorporated herein in its entirety by reference.

BACKGROUND OF THE INVENTION

1. Field of the Invention

The present invention relates to a link information extracting apparatus, a link information extracting method, and recording medium.

2. Description of the Related Art

Research has been performed for finding out particular electronic information from many pieces of electronic information accompanied with URLs such as blog, HP (home pages) and the like.

Patent Document 1 (JP-2008-33599A) describes a spam blog as an example of electronic information. In the following, a spam blog is called the "splog."

When particular electronic information is, for example, a splog, a research is performed by an expert who is familiar with splogs (hereinafter simply called the "expert").

For example, the expert actually browses blog texts and HPs linked to the blog, determines that the blog is a harmful affiliate site, i.e., a splog, and creates a black list for identifying the blog.

In this regard, the expert determines whether or not a blog under research is a splog with reference to a large amount of contributions to the blog from the same domain, contributions of comments and track backs, users who are delivering a dos (Denial of Services)/ddos (Distributed Denial of Service) attack, and the like.

On the other hand, when particular electronic information is electronic information which describes contents related to a particular hobby, a research is performed by a user who is familiar with the particular hobby.

The research is performed by a person. Accordingly, a problem arises in that the person is heavily burdened in performing the research.

SUMMARY OF THE INVENTION

An exemplary object of the present invention is to provide a link information extracting apparatus, a link information extracting method, and a recording medium which are capable of solving the aforementioned problem.

A link information extracting apparatus according to an exemplary aspect of the invention includes:

a storage unit which stores first link information classified into a particular type;

a take-in unit which takes in a plurality of pieces of electronic information;

a classifier unit which classifies each of the electronic information taken in by the take-in unit into first electronic information which describes the first link information in the storage unit and second electronic information which does not describe the first link information;

a generator unit which generates third link information based on second link information when the first electronic information describes the second link information that is different from the first link information; and an output unit which generates possibility information indicative of a possibility that the third link information is classified into a particular type, based on the third link information and at least the first electronic information or the second electronic information, and outputs the possibility information and the third link information in association with each other.

A link information extracting method according to an exemplary aspect of the invention includes:

storing first link information classified into a particular type in a storage unit;

taking in a plurality of pieces of electronic information;

classifying each of the taken-in electronic information into first electronic information which describes the first link information in the storage unit and second electronic information which does not describe the first link information;

generating third link information based on second link information when the first electronic information describes the second link information that is different from the first link information; and generating possibility information indicative of a possibility that the third link information is classified into the particular type, based on the third link information and at least the first electronic information or the second electronic information, and outputting the possibility information and the third link information in association with each other.

A recording medium according to an exemplary aspect of the invention is a computer readable recording medium having a program recorded thereon for causing a computer to execute:

a storing procedure for storing first link information classified into a particular type in a storage unit;

a take-in procedure for taking in a plurality of pieces of electronic information;

a classifying procedure for classifying each of the taken-in electronic information into first electronic information which describes the first link information in the storage unit and second electronic information which does not describe the first link information;

a generating procedure for generating third link information based on second link information when the first electronic information describes the second link information that is different from the first link information; and an outputting procedure for generating possibility information indicative of a possibility that the third link information is classified into the particular type, based on the third link information and at least the first electronic information or the second electronic information, and outputting the possibility information and the third link information in association with each other.

The above and other objects, features, and advantages of the present invention will become apparent from the following description with reference to the accompanying drawings which illustrate an example of the present invention.

BRIEF DESCRIPTION OF THE DRAWINGS

FIG. 2 is an explanatory diagram showing exemplary blog identification information stored in storage unit 13a;

FIG. 4 is an explanatory diagram showing an exemplary blog (blog A);

FIG. 5 is an explanatory diagram showing a black list URL in black list DB 11;

FIG. 6 is an explanatory diagram showing an output list generated using score 1;

FIG. 7 is an explanatory diagram showing a white list URL in white list DB 15*a*;

FIG. 8 is an explanatory diagram showing an output list which is created by deleting a decomposed URL "domain4/dir9" from the output list shown in FIG. 6;

FIG. 9 is an explanatory diagram showing an output list which is created by deleting the decomposed URL "domain4/dir9" from the output list shown in FIG. 8; and FIG. 10 is an explanatory diagram showing a new black list URL which has a decomposed URL "domain2/dir4" additionally added to black list DB 11 shown in FIG. 5.

DESCRIPTION OF THE EXEMPLARY EMBODIMENTS

In the following, an exemplary embodiment of the present invention will be described with reference to the accompanying drawings.

Figure 1:
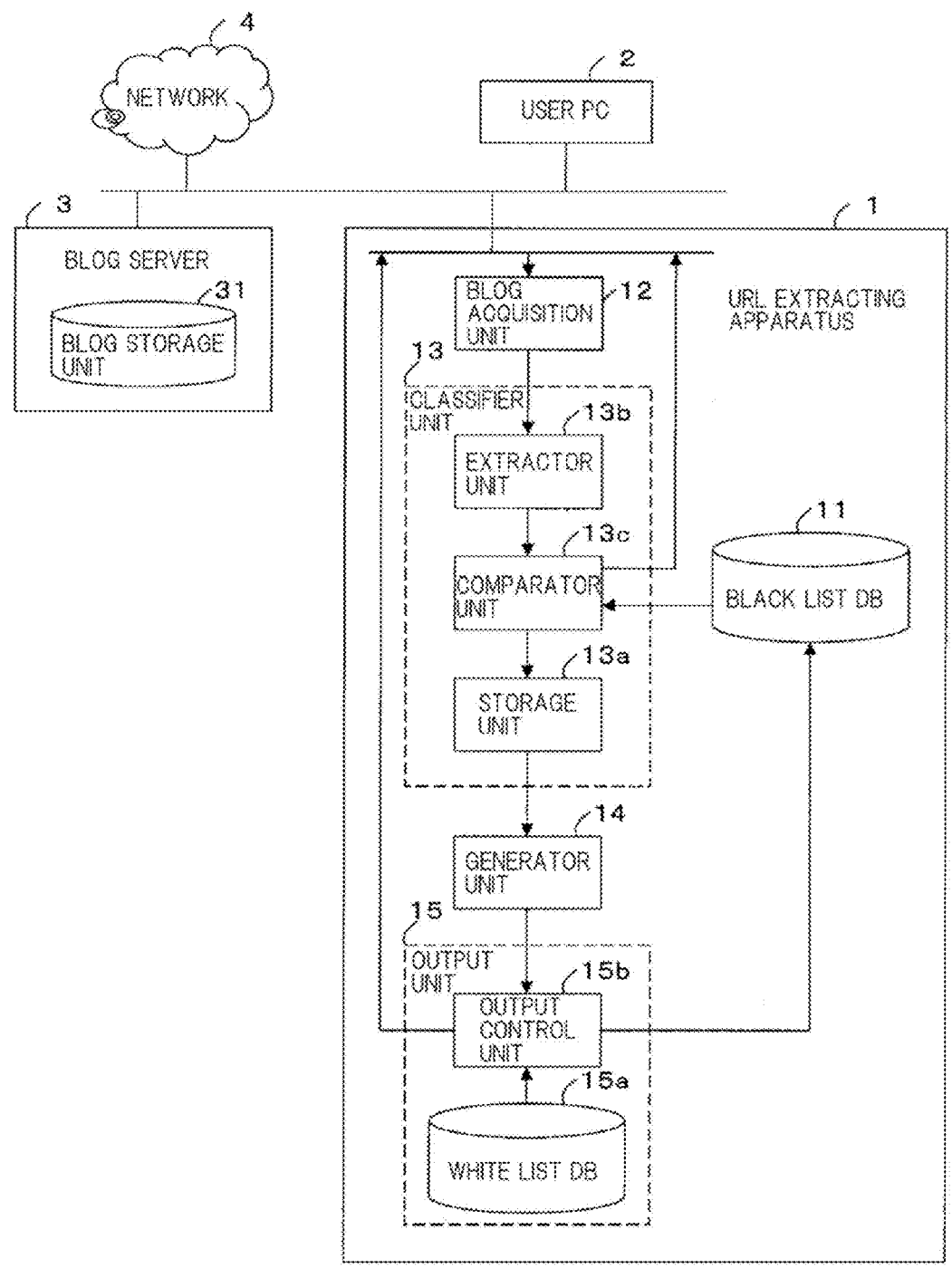
FIG. 1 is a block diagram showing a URL extracting apparatus according to one exemplary embodiment of the present invention.

FIG. 1 is a block diagram showing a URL (Uniform Resource Locator) extracting apparatus according to one exemplary embodiment of the present invention. The URL extracting apparatus can be generally called a link information extracting apparatus. A URL can be generally called link information.

In FIG. 1, URL extracting apparatus 1 is connected to user PC (Personal Computer) 2, blog server 3, and network 4, respectively.

User PC 2 is used by the user of URL extracting apparatus 1. User PC 2 provides URL extracting apparatus 1 with an operation start signal, for example, in response to a manipulation of the user.

Blog server 3 can be generally called a storage device. Blog server 3 includes blog storage unit 31 for storing a plurality of blogs. A blog can be generally called electronic information.

URL extracting apparatus 1 comprises black list DB (database) 11, blog acquisition unit 12, classifier unit 13, generator unit 14, and output unit 15. Classifier unit 13 includes storage unit 13*a*, extractor unit 13*b*, and comparator unit 13*c*. Output unit 15 includes white list DB 15*a* and output control unit 15*b*.

Black list DB 11 can be generally called storing means or storage unit.

Black list DB 11 stores URLs which are classified into a type to which URLs described in a splog belong (hereinafter called the "black list URL"). The type to which URLs described in a splog belong can be generally called a particular type.

The black list URL can be generally called a first URL or first link information. There may be one or a plurality of black list URLs. The following description will be given on the assumption that a plurality of black list URLs reside within black list DB 11.

Blog acquisition unit 12 can be generally called take-in means or take-in unit.

Blog acquisition unit 12 can communicate with user PC 2, blog server 3, and network 4, respectively.

In this exemplary embodiment, upon receipt of an operation start signal from user PC 2, blog acquisition unit 12 obtains a plurality of blogs by acquiring the plurality of blogs from blog storage unit 31 within blog server 3.

Alternatively, blog acquisition unit 12 may obtain a plurality of blogs by receiving the plurality of blogs from user PC 2.

Upon obtaining a plurality of blogs, blog acquisition unit 12 provides the plurality of blogs to classifier unit 13.

Classifier unit 13 can be generally called classifying means.

Upon receipt of a plurality of blogs from blog acquisition unit 12, classifier unit 13 classifies each of the blogs into a blog which includes a black list URL described in black list DB 11 (hereinafter called the "first blog") and a blog which does not include any black list URL in black list DB 11 (hereinafter called the "second blog").

The first blog can be generally called first electronic information. The second blog can be generally called second electronic information.

Storage unit 13*a* stores the result of classification by classifier unit 13.

Extractor unit 13*b* extracts URL described in each of the blogs provided from blog acquisition unit 12 on a blog-by-blog basis.

A URL described in a blog is a linked URL which is described at least in a link tag of the blog. Alternatively, a URL described in a blog may be both a linked URL described in a link tag of the blog and a URL described in texts of the blog.

Extractor unit 13*b* associates a URL extracted from a blog with identification information of the blog (for example, the URL or IP address of the blog or the blog itself) on a blog-by-blog basis. Extractor unit 13*b* provides comparator unit 13*c* with the associated URLs and identification information of the blogs.

Upon receipt of the URLs and blog identification information from extractor unit 13*b*, comparator unit 13*c* compares the received URLs with black list URLs in black list DB 11.

If the received URLs include (or is pertinent to) any of the black list URLs, comparator unit 13*c* appends a flag indicative of a splog to the identification information of the blog associated with the URL which includes a black list URL. Comparator unit 13*c* stores the flagged blog identification information in storage unit 13*a*.

On the other hand, if the received URLs do not include any of the black list URLS, comparator unit 13*c* appends a flag indicative of a normal blog to the blog identification information associated with the URL which does not include any black list URL. Comparator unit 13*c* stores the flagged blog identification information in storage unit 13*a*.

FIG. 2 is an explanatory diagram showing exemplary blog identification information stored in storage unit 13*a*. In FIG. 2, a blog name is used as the blog identification information for simplifying the description.

Blogs appended with a flag indicative of a splog (for example, blogs A-C shown in FIG. 2) are classified into the first blogs. Blogs appended with a flag indicative of a normal blog (for example, blogs D-G shown in FIG. 2) are classified into the second blogs.

Turning back to FIG. 1, generator unit 14 can be generally called generating means.

When an URL other than black list URLs (hereinafter called the "impertinent URL") is described in the first blog, generator unit 14 generates a third URL based on the impertinent URL. The impertinent URL can be generally called a second URL or second link information. The third URL in turn can be generally called third link information.

For example, when a slash exists within an impertinent URL, generator unit 14 generates the same URL as the impertinent URL, as a decomposed URL, and deletes a portion which follows the slash within the impertinent URL, from the impertinent URL to generate the decomposed URL. Each decomposed URL corresponds to a third URL.

When a plurality of slashes exist within an impertinent URL, generator unit 14 generates the same URL as the impertinent URL, as a decomposed URL, and deletes a portion which follows each slash from the impertinent URL to generate a plurality of decomposed URLs. Generator unit 14 provides output unit 15 with the decomposed URL(s).

Output unit 15 can be generally called output means.

Output unit 15 generates possibility information (hereinafter called the "score") indicative of the possibility with which a decomposed URL is classified into URLs described in splogs, based on the decomposed URL and at least the first blog or second blog.

For example, output unit 15 generates the score for each decomposed URL based on this decomposed URL and at least the first blog or second blog.

Output unit 15 outputs the score and decomposed URL in association with each other to user PC2 in a list format. In the following, this output in a list format is called the output list.

In this regard, when a plurality of decomposed URLs includes a particular URL which presents an associated score indicative of a possibility higher than another decomposed URL and which belongs to the other decomposed URL, output unit 15 deletes the other decomposed URL from the output list. In this event, output unit 15 outputs an output list, from which the other decomposed URL has been deleted, to user PC 2.

Also, when the possibility indicated by a score associated with a decomposed URL exceeds a previously set value, output unit 15 additionally stores this decomposed URL in black list DB 11 as a new black list URL.

Additionally, the user may manipulate user PC 2, while viewing the output list from output unit 15, displayed by user PC 2, to additionally store an arbitrary decomposed URL in the list as a new black list URL in black list DB 11. In this event, output unit 15 may not additionally store the decomposed URL in black list DB 11 as a new black list URL.

Also, when a decomposed URL is additionally stored in black list DB 11 as a new black list URL, classifier unit 13 (specifically, comparator unit 13*c*) again classifies a blog which describes the new black list URL, included in those blogs previously classified into the second blog, into the first blog, and outputs a list indicative of the first blogs (for example, a URL list indicative of URLs of the first blogs) to user PC 2.

This list indicates blogs originally classified into the first blog, and blogs re-classified into the first blog after having once been classified into the second blog (for example, URLs of the blogs).

White list DB 15*a* can be generally called storing means.

White list DB 15*a* stores URLs which are not classified into URLs described in splogs (hereinafter called the "white list URL"). The white list URL can be generally called a fourth URL or fourth link information.

Output control unit 15*b* can be generally called output control means.

Output control unit 15*b* executes the aforementioned processing performed by output unit 15. Also, output control unit 15*b* deletes a decomposed URL from the output list if the decomposed URL is stored in white list DB 15*a*.

Output control unit 15*b* outputs to user PC 2 the output list from which the decomposed URL has been deleted as mentioned above.

URL extracting apparatus 1 shown in FIG. 1 may be implemented by a computer which operates in accordance with a program recorded on a CD-ROM, a hard disk or a memory. The CD-ROM, hard disk, or memory can be generally called a computer readable recording medium.

In this event, the computer reads and executes the program from a recording medium to function as black list DB 11, blog acquisition unit 12, classifier unit 13, generator unit 14, and output unit 15, thereby implementing URL extracting apparatus 1.

Next, the operation will be described.

Figure 3:
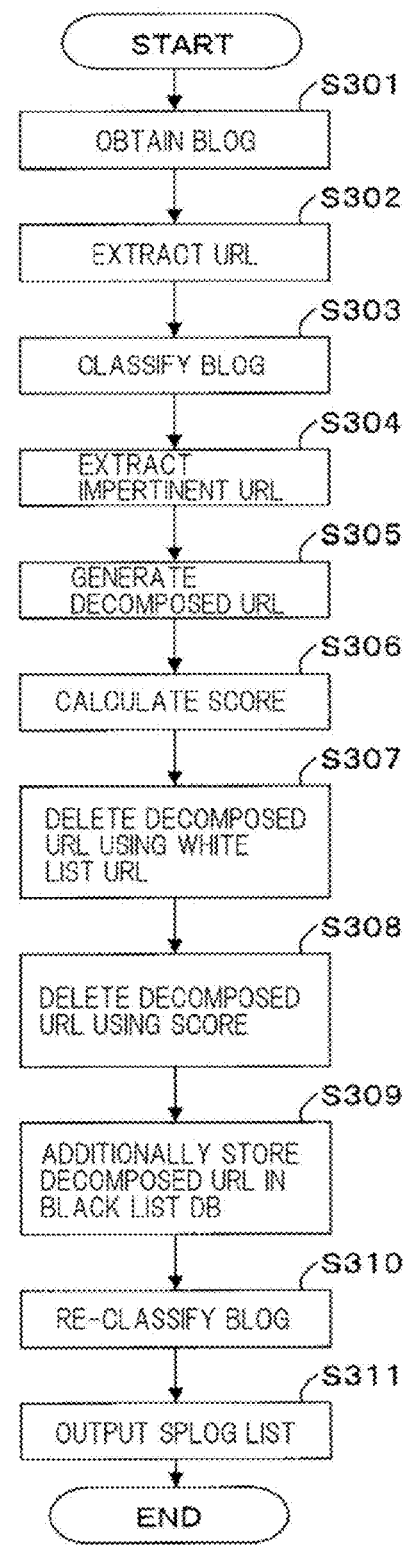
FIG. 3 is a flow chart for describing the operation of URL extracting apparatus 1.

FIG. 3 is a flow chart for describing the operation of URL extracting apparatus 1. In the following, the operation of URL extracting apparatus 1 will be described with reference to FIG. 3.

At step 301, upon receipt of an operation start signal from user PC 2, blog acquisition unit 12 obtains a plurality of blogs from blog storage unit 31 within blog server 3, and provides the plurality of blogs to classifier unit 13 (specifically, extractor unit 13*b*).

Subsequently, at step 302, upon receipt of the plurality of blogs from blog acquisition unit 12, extractor unit 13*b* extracts URLs described in the blogs on a blog-by-blog basis.

In this exemplary embodiment, extractor unit 13*b* searches texts and links of the blogs of interest for <a href="linked URL"> link name </a> in the case of a link tag (HTML (HyperText Markup Language), to extract linked URLs. Further, extractor unit 13*b* extracts URLs described in the texts of the blogs of interest.

Extractor unit 13*b* associates URLs extracted from blogs with blog identification information on a blog-by-blog basis, and provides comparator unit 13*c* with the associated URLs and blog identification information.

Subsequently, at step 303, upon receipt of the URLs and blog identification information from extractor unit 13*b*, comparator unit 13*c* compares the received URLs with black list URLs in black list DB 11.

If any of black list URLs is included in (pertinent to) the received URLs, comparator unit 13*c* appends a flag indicative of a splog to blog identification information associated with a URL which includes a black list URL. Comparator unit 13*c* stores the flagged blog identification information in storage unit 13*a*.

On the other hand, any of the black list URLs is not included in (pertinent to) the received URLs, comparator unit 13*c* appends a flag indicative of a normal flag to blog identification information associated with the URL which does not include any black list URL. Comparator unit 13*c* stores the flagged blog identification information in storage unit 13*a*.

Subsequently, at step 304, generator unit 14 extracts an impertinent URL which is not pertinent to the black list URLs stored in black list DB 11 from all URLs described in the blogs (first blogs) flagged as splogs.

Subsequently, at step 305, generator unit 14 generates a decomposed URL based on the impertinent URL.

For example, when a plurality of slashes exist within the impertinent URL, generator unit 14 generates the same URL as the impertinent URL, as a decomposed URL, and deletes a portion which follows each slash from the impertinent URL to generate a plurality of decomposed URLs.

Stated another way, generator unit 14 decomposes the impertinent URL into all patterns which have a directory including a domain delimited by any "/(slash)" to generate the decomposed URLs.

For example, when the impertinent URL is "http://domain/directory1/directory2/directory3," generator unit 14 generates all patterns, each including a domain, as decomposed URLs such as "domain," "domain/directory1," "domain/directory1 directory2," "domain/directory1/directory2/directory3."

However, generator unit 14 may also generate all patterns, any of which does not include any domain, such as "directory1," "directory2/directory3" and the like as decomposed URLs.

Also, when a domain includes a sub-domain, generator unit 14 may delimit the domain between the sub-domain and main domain, and add the result of the delimitation to decomposed URLs.

For example, when the impertinent URL is "http://subdomain.main domain/ . . . ," generator unit 14 may generate "sub-domain main domain," "main domain" and the like as decomposed URLs.

Generator unit 14 provides the decomposed URLs to output unit 15.

Subsequently, at step 306, output unit 15 (specifically, output control unit 15b) generates a score for each decomposed URL based on the decomposed URL and at least the first blog or second blog.

Output control unit 15b associates the score and its decomposed URL with each other, ranks the decomposed URLs based on the scores, and outputs the ranked decomposed URLs in a list format. This output in the list format is used as an output list.

Here, a description will be given of an exemplary calculation of the score by output control unit 15b.

Exemplary Score 1: Used as the score is a value (hereinafter called the "first value") calculated by dividing the number of blogs which satisfy "including decomposed URL" and "blogs recognized as splogs (which have linked URLs described therein)" by the number of blogs which satisfy "including decomposed URLs" and "all blogs of interest (which have linked URLs described therein)."

In this regard, the number of blogs which satisfy "including a decomposed URL" and "a blog recognized as a splog (which has linked URL described therein)" means the number of blogs which are recognized as splogs out of those blogs which include decomposed URLs of interest (hereinafter called "decomposed URLs of interest").

Also, the number of blogs which satisfy "including a decomposed URL" and "all blogs of interest (which have linked URLs described therein)" means the number of blogs which include decomposed URLs of interest.

Accordingly, the first value indicates the proportion of blogs which are recognized as splogs to those blogs which include decomposed URLs of interest.

Thus, since the first value is closer to "1," there is a greater possibility that a decomposed URL of interest will be classified into a type to which a URL, which is described in a splog, belongs.

Output control unit 15b finds the number of blogs which include decomposed URLs of interest by calculating the sum of the number of blogs which describe decomposed URLs of interest, out of the first blogs, and the number of blogs which describe decomposed URLs of interest, out of the second blogs.

Output control unit 15b counts the number of blogs which describes decomposed URLs of interest out of the first blogs to find the number of blogs recognized as splogs out of those blogs which include decomposed URLs of interest.

Accordingly, output control unit 15b finds the first value based on the decomposed URLs of interest, first blogs, and second blogs.

In this event, the number of blogs which satisfy "including a decomposed URL" and "a blog recognized as a splog (which has a linked URL described therein)" (hereinafter called the "second value") may also be added as a score.

The second value indicates the number of blogs which are recognized as splogs out of those blogs which include decomposed URLs of interest. Output control unit 15b finds the second value based on the decomposed URLs of interest, and the first blogs.

Thus, when decomposed URLs have an equal first value, for example, there is a greater possibility that a decomposed URL of interest having a larger second value will be classified into a type to which a URL, that is described in a splog, belongs.

Exemplary Score 2: Used as a score is a value calculated by dividing the number of blogs which satisfy "including a decomposed URL" and "a blog recognized as a splog (which has a linked URL described therein)" by the number of blogs recognized as splogs (which have linked URLs described therein) (hereinafter called the "third value").

In this regard, the number of blogs which satisfy "including a decomposed URL" and "a blog recognized as a splog (which has a linked URL described therein)" means the number of blogs which include decomposed URLs of interest out of those blogs which are recognized as splogs.

Accordingly, the third value indicates the proportion of blogs which include decomposed URLs of interest to those blogs which are recognized as splogs.

Thus, since the third value is closer to "1," there is a greater possibility that a decomposed URL of interest will be classified into a type to which a URL, which is described in a splog, belongs.

In this regard, output control unit 15b finds the number of blogs recognized as splogs by counting the number of first blogs.

Also, output control unit 15b finds the number of blogs recognized as splogs out of the blogs which include decomposed URLs of interest by counting the number of blogs which describe the decomposed URLs of interest, out of the first blogs.

Accordingly, output control unit 15b finds the third value based on the decomposed URLs of interest and first blogs.

In this event, a value calculated by dividing the number of blogs which satisfy "including a decomposed URL" and "a blog recognized as a normal blog (which has a linked URL described therein)" by the number of blogs recognized as normal blogs (which have linked URLs described therein) may further be added as a score (hereinafter called the "fourth value").

The number of blogs which satisfy "including a decomposed URL" and "a blog recognized as a normal blog (which has a linked URL described therein)" means the number of blogs which include decomposed URLs of interest out of those blogs which are recognized as normal.

Accordingly, the fourth value indicates the proportion of blogs which include decomposed URLs of interest to those blogs which are recognized as normal.

Thus, since the fourth value is smaller, there is a greater possibility that a decomposed URL of interest will be classified into a type to which a URL, which is described in a splog, belongs.

Thus, when decomposed URLs have an equal third value, for example, there is a greater possibility that a decomposed URL of interest having a larger fourth value will be classified into a type to which a URL, which is described in a splog, belongs.

Output control unit 15b finds the number of blogs recognized as normal by counting the number of second blogs.

Output control unit 15b finds the number of blogs recognized as normal out of those blogs which include decomposed URLs of interest by counting the number of blogs which describe the decomposed URLs of interest out of the second blogs.

Accordingly, output control unit 15b finds the fourth value based on the decomposed URLs of interest and the second blogs.

In this regard, calculation of the score by output control unit 15b is not limited to Exemplary Scores 1, 2, but can be modified as appropriate.

For example, in Exemplary Score 2, the third value is used as a score, and the fourth value is used as an auxiliary score, but the fourth value may be used as a score. In this event, the third value is preferably used as an auxiliary score.

Subsequently, at step 307, output control unit 15b compares decomposed URLs on the output list with white list URLs stored in white list DB 15a, and deletes the decomposed URLs from the output list when both completely match each other.

For example, when "www.*.jp" is stored as a white list URL, output control unit 15b deletes decomposed URL "www.*.jp" but does not delete decomposed URL "www.***.jp/spam."

Subsequently, at step 308, when decomposed URLs having higher scores include all decomposed URLs having lower scores or the decomposed URLs belong to the decomposed URLs having lower scores, output control unit 15b deletes the decomposed URLs having lower scores from the output list. Output control unit 15b outputs the resulting output list to user PC 2.

Subsequently, at step 309, output control unit 15b additionally stores decomposed URLs which have a predefined score or more, out of the decomposed URLs on the output list, in black list DB 11 as new black list URLs.

Additionally, the user may manipulate user PC 2, while viewing the output list from output unit 15, displayed by user PC 2, to additionally store an arbitrary decomposed URL in the list, as a new black list URL, in black list DB 11.

In this event, since the user is provided with black list URL candidates which may be additionally stored in black list DB 11, the user may select a new black list URL as appropriate from the candidates. Consequently, finding a black list URL is less trouble for the user.

Subsequently, at step 310, comparator unit 13c compares the first blogs flagged (recognized) as normal blogs with black list URLs within updated black list DB 11, changes (recognizes) the flag of a first blog which describes a black list URL to a splog, and stores the changed first blog in storage unit 13a.

Subsequently, at step 311, comparator unit 13c extracts a list of blogs appended with a flag indicative of a splog (for example, a list of URLs in blogs appended with the flag indicative of splog), and outputs the list to user PC 2, or deletes the blogs on the list or delete links to the blogs.

It is therefore possible to extract a blog appended with a flag indicative of a splog or to extract a URL list of such blogs and to accurately exclude splogs.

When a URL list is output to user PC 2, the user of user PC 2 may delete a blog shown in the list or delete a link to that blog while viewing the list.

In this event, since splog candidates are provided to the user, the user may simply select a splog from the candidates, and delete the splog or a link to this splog. Consequently, finding splogs is less trouble for the user.

Next, the operation of URL extracting apparatus 1 will be described using a specific example.

FIG. 4 is an explanatory diagram showing an exemplary blog (blog A) provided to extractor unit 13b by blog extractor unit 12.

FIG. 5 is an explanatory diagram showing black list URLs within black list DB 11.

In this event, at step 302, extractor unit 13b extracts "http://domain1/dir1/dir2/dir3/" and "http://domein2/dir4/dir5/dir6/" from blog A.

Subsequently, at step 303, since a black list URL "domain1/dir1" is included in "http://domain1/dir1/dir2/dir3/" ("domain1/dir1/dir2/dir3" is subordinate to black list URL "domain1/dir1"), comparator unit 13c determines that "http://domain1/dir1/dir2/dir3/" is pertinent to the black list URL "domain1/dir1," flags blog A as a splog, and stores flagged blog A in storage unit 13a.

Subsequently, at step 304, generator unit 14 extracts "http://domein2/dir4/dir5/dir6/" which is not pertinent to a black list URL from a linked URL of blog A as an impertinent URL.

Subsequently, at step 305, generator unit 14 generates "domain2," "domain2/dir4," "domain2/dir4/dir5," and "domain2/dir4/dir5/dir6" from "http://domein2/dir4/dir5/dir6/" which is an impertinent URL, as decomposed URLs. In the following, a description of "domain2/dir4/dir5" and "domain2/dir4/dir5/dir6" is omitted in order to simplify the description.

For step 306, the operation will be described in the following situation. Step 306 is performed by output control unit 15b.

Blogs which are flagged as splogs are "blog A," "blog B," and "blog C," while blogs which are flagged as normal blogs are "blog D," "blog E," "blog F," and "flog G."

Blogs which include "domain2" are "blog A," "blog B," "blog D," and "blog E," while blogs which do not include "domain2" are "blog C," "blog F," and "blog G."

Blogs which include "domain2/dir4" are "blog A" and "blog B," while blogs which do not include "domain2/dir4" are "blog C," "blog D," "blog E," "blog F," and "blog G."

(Example of Calculating Exemplary Score 1)

For Decomposed URL "domain2"

The number of blogs which include decomposed URL "domain2" and are flagged as splogs is two (blogs A and B).

The number of blogs which include decomposed URL "domain2" among all blogs of interest is four (blogs A, B, D, and E).

Accordingly, the score of decomposed URL "domain2" is 0.5 (=2/4).

In this regard, 2/4=0.5 indicates the proportion of blogs which are recognized as splogs to the blogs which include decomposed URL "domain2."

For Decomposed URL "domain2/dir4"

The number of blogs which include decomposed URL "domain2/dir4" and which are flagged as splogs is two (blogs A and B).

The number of blogs which include decomposed URL "domain2/dir4" among all blogs of interest is two (blogs A and B).

Accordingly, the score of decomposed URL "domain2/dir4" is 1.0 (=2/2).

In this regard, 2/2=1.0 indicates the proportion of blogs which are recognized as splogs to those blogs which include decomposed URL "domain2/dir4.

Ranking by Score

Since decomposed URL "domain2/dir4" has a higher score than decomposed URL "domain2," decomposed URL "domain2/dir4" is ranked higher than decomposed URL "domain2."

(Example of Calculating Exemplary Score 2)

For Decomposed URL "domain2"

The number of blogs which include decomposed URL "domain2" and which are flagged as splogs is two (blogs A and B).

The number of blogs flagged as splogs is three (blogs A, B, and C).

Accordingly, the score of decomposed URL "domain2" is 0.67 (=2/3).

In this regard, 2/3=0.67 indicates the proportion of blogs which include decomposed URL "domain2" among blogs recognized as splogs.

The number of blogs which include decomposed URL "domain2" and are flagged as normal blogs is two (blogs D and E).

The number of blogs flagged as normal blogs is four (blogs D, E, F, and G) Another score of decomposed URL "domain2" is 0.5 (=2/4).

In this regard, 2/4=0.5 indicates the proportion of blogs which include decomposed URL "domain2" among blogs recognized as normal.

For Decomposed URL "domain2/dir4"

The number of blogs which include decomposed URL "domain2/dir4" and are flagged as splogs is two (blogs A and B).

The number of blogs flagged as splogs is three (blogs A, B, and C).

Accordingly, the score of decomposed URL "domain2/dir4" is 0.67 (=2/3).

In this regard, 2/3=0.67 indicates the proportion of blogs which include decomposed URL "domain2/dir4" to those blogs which are recognized as splogs.

The number of blogs which include decomposed URL "domain2/dir4" and which are flagged as normal blogs is zero.

The number of blogs flagged as normal blogs is four (blogs D, E, F, and G).

Another score of decomposed URL "domain2/dir4" is 0.0 (=0/4).

In this regard, 0.0 indicates the proportion of blogs which include decomposed URL "domain2/dir4" to those blogs which are recognized as normal.

Ranking by Score

While decomposed URL "domain2" has the same score as decomposed URL "domain2/dir4," decomposed URL "domain2/dir4" has another score lower than that of decomposed URL "domain2." Accordingly, decomposed URL "domain2/dir4" is ranked higher than decomposed URL "domain2."

Output control unit 15b associates the scores and decomposed URLs with each other, ranks the decomposed URLs based on the scores, and generates an output list.

FIG. 6 is an explanatory diagram showing the output list generated using Exemplary Score 1.

FIG. 7 is an explanatory diagram showing white list URLs within white list DB 15a.

Subsequently, at step t307, decomposed URL "domain4/dir9" on the output list shown in FIG. 6 completely matches white list URL "domain4/dir9" within white list DB 15a shown in FIG. 7, so that output control unit 15b deletes decomposed URL "domain4/dir9" from the output list.

FIG. 8 is an explanatory diagram showing the output list created by deleting decomposed URL "domain4/dir9" from the output list shown in FIG. 6.

Subsequently, at step 308, decomposed URL "domain2" which includes part of the first ranked decomposed URL "domain2/dir4" on the output list is ranked at the sixth place, so that output control unit 15b deletes the sixth ranked decomposed URL "domain2" from the output list.

FIG. 9 is an explanatory diagram showing the output list created by deleting decomposed URL "domain4/dir9" from the output list shown in FIG. 8.

Subsequently, at step 309, output control unit 15b adds decomposed URLs "domain2/dir4" and the like which have scores equal to or higher than a predefined score (for example, 0.8) among the decomposed URLs on the output list to black list DB 11.

FIG. 10 is an explanatory diagram of black list DB 11 shown in FIG. 5 to which decomposed URL "domain2/dir4" has been added as a new black list URL.

Subsequently, at step 310, classifier unit 13 re-classifies a blog which describes the new black list URL into the first blog among those blogs (blogs D, E, F, and G) which have been previously classified into the second blog.

Subsequently, at step 311, classifier unit 13 outputs a list showing the first blogs (for example, a URL list showing URLs of the first blogs) to user PC 2.

In the foregoing embodiment, blogs are used as electronic information, but electronic information is not limited to blogs but may be HPs, electronic mails and the like.

Also, in the foregoing exemplary embodiment, steps 306 and 307 may be reversed in order. In this event, processing for calculating the score of white list URL can be omitted. Consequently, processing can be simplified.

Also, in the foregoing exemplary embodiment, when a splog is defined to be a particular blog (for example, a blog by a person who has the same hobby, a blog in a certain category, or the like); a black list URL to be a URL of the particular blog; a normal blog to be another blog; and a white list URL to be a URL of the other blog, blogs of interest can be divided into the particular blog and the other blog, and the particular blog (or its URL) can be extracted.

In this event, for example, a book mark list can be created for blogs by persons who have the same hobby.

Next, advantages of this exemplary embodiment will be described.

In this exemplary embodiment, classifier unit 13 classifies each piece of electronic information into first electronic information which describes a first URL (first link information) classified into a particular type, and second electronic information which does not describe the first URL.

Generator unit 14 generates a third URL (third link information) based on a second URL (second link information) when the first electronic information describes the second URL other than the first URL.

Output unit 15 generates a score for the third URL based on this third URL and at least the first electronic information or second electronic information, and outputs the score and third URL in association with each other.

The score represents the possibility that the third URL is classified into a particular type.

Thus, the third URL can be designated as a candidate for the first URL used to classify electronic information into the first electronic information, and the possibility can also be indicated for the third URL which can be used as the first URL.

Accordingly, it is possible to support a worker who executes a task of classifying electronic information into the first electronic information. Thus, the worker can be less burdened.

This exemplary embodiment uses the type of URL to which a URL described in a splog belongs as the particular type.

In this event, the third URL can be designated as a candidate for a black list URL used to classify electronic information into a splog, and the possibility can also be indicated for the third URL which can be used as the black list URL.

It is therefore possible to support a worker who executes a task of classifying electronic information into splogs which increase day by day. Thus, the worker can be less burdened.

In this exemplary embodiment, when a slash exists in a second URL, generator unit 14 generates the same URL as the second URL, as a third URL, and deletes a portion which follows the slash within the second URL from the second URL to generate the third URL.

In this event, other than the same URL, as the second URL, a URL associated with the second URL can be generated as the third URL.

Consequently, many candidates can be proposed for the first URL. Also, a common part of URLs classified into the particular type can be designated as a candidate for the first URL.

In this exemplary embodiment, when a plurality of slashes exist within a second URL, generator unit 14 generates the same URL as the second URL, as a third URL, and deletes a portion which follows each slash from the second URL to generate a plurality of third URLs.

In this event, more candidates can be proposed for the first URL. Also, a common part of a URL classified into the particular type can be designated as a candidate for the first URL.

In this exemplary embodiment, when a plurality of third URLs includes a particular URL which has a score indicative of a higher possibility than another third URL and which belongs to this other third URL, output unit 15 deletes this other URL.

In this event, it is possible to delete third URLs which are possibly duplicates.

In this exemplary embodiment, when a third URL is stored in white list DB 15*a*, output unit 15 deletes this third URL.

In this event, a URL which has been previously determined not to be classified into the particular type can be excluded from candidates for the first URL.

In this exemplary embodiment, a score associated with a third URL indicates a possibility which exceeds a previously set value, and output unit 15 additionally stores this third URL in black list DB 11 as a new first URL.

In this event, a third URL which is highly likely to be classified into the particular type can be additionally stored in black list DB 11 as a new first URL in an automated manner.

In this exemplary embodiment, when a third URL is additionally stored in black list DB 11 as a new first URL, classifier unit 13 reclassifies fifth electronic information which describes the new first URL, among the second electronic information, into the first electronic information, and outputs a list which shows the first electronic information.

In this event, the classification can be done again in association with an update of black list DB 11.

In this exemplary embodiment, blog acquisition unit 12 acquires a plurality of pieces of electronic information from blog server 3.

In this event, a plurality of pieces of electronic information are readily collected.

In the exemplary embodiment described above, the illustrated configuration is merely an example, and the present invention is not limited to that configuration.

For example, each link information is not limited to URL in a blog, a home page and the like, but may be a track back URL, or a commenting URL and the like.

An exemplary advantage according to the present invention is the ability to reduce a burden on a worker who performs a research operation for finding a particular item of electronic information from among many items of electronic information.

While the invention has been particularly shown and described with reference to exemplary embodiments thereof, the invention is not limited to these exemplary embodiments.

It will be understood by those of ordinary skill in the art that various changes in form and details may be made therein without departing from the spirit and scope of the present invention as defined by the claims.

What is claimed is:

1. A link information extracting apparatus comprising:
   a storage unit which stores a first URL classified into a particular type;
   a take-in unit which takes in a plurality of pieces of electronic information;
   a classifier unit which classifies each piece of electronic information taken in by said take-in unit into first electronic information which describes the first URL in said storage unit and or into second electronic information which does not describe the first URL;
   a generator unit which generates a third URL based on a second URL when the first electronic information describes the second URL that is different from the first URL; and
   an output unit which generates possibility information indicative of a possibility that the third URL is classified into a into said particular type, based on the third URL and based on at least one from among the first electronic information and the second electronic information, and outputs the possibility information and the third URL in association with each other, wherein:
   when a slash exists in the second URL, said generator unit generates URLs that are used as third URLs, said URLs comprising a URL, which is the same as the second URL, and comprising a URL that is created by deleting a portion which follows the slash from the second URL,
   said output unit generates the possibility information for each of the third URLs based on the third URL and based on at least one from among the first electronic information and the second electronic information, and outputs the possibility information and the third URL in association with each other, and
   when the third URLs include a particular URL which has possibility information indicative of a possibility higher than another third URL and which belongs to the other third URL, said output unit deletes the other third URL.

2. The link information extracting apparatus according to claim 1, wherein said particular type is a type to which a URL described in a spam blog belongs.

3. The link information extracting apparatus according to claim 1, wherein:
   when a plurality of slashes exist in the second URL, said generator unit generates a plurality of URLs that are used as third URLs, said plurality of URLs comprising a URL, which is the same as the second URL, and comprising URLs that are created by deleting a portion which follows each of the slashes from the second URL.

4. The link information extracting apparatus according to claim 1, wherein said output unit includes a memory unit for storing fourth link information which is not classified into a particular type, and deletes the third link information when the third link information is the fourth link information.

5. The link information extracting apparatus according to claim 1, wherein:
   when said possibility information associated with the third link information indicates a possibility which exceeds a previously set value, said output unit additionally stores the third link information in said storage unit as a new piece of the first link information.

6. The link information extracting apparatus according to claim 5, wherein:
when the third link information is additionally stored in said storage unit as the new first link information, said classifier unit re-classifies fifth electronic information which describes the new first link information, among the second electronic information, into the first electronic information, and outputs a list showing the first electronic information.

7. The link information extracting apparatus according to claim 1, wherein said take-in unit communicates with a storage device for storing a plurality of pieces of electronic information, and takes in the plurality of pieces of electronic information by acquiring the plurality of pieces of electronic information from said storage device.

8. A link information extracting apparatus comprising:
storing means for storing a first URL classified into a particular type;
take-in means for taking in a plurality of pieces of electronic information;
classifying means for classifying each piece of the electronic information taken in by said take-in means into first electronic information which describes the first URL in said storing means or into second electronic information which does not describe the first URL;
generating means for generating a third URL based on a second URL when the first electronic information describes the second URL that is different from the first URL; and
outputting means for generating possibility information indicative of a possibility that the third URL is classified into said particular type, based on the third URL and based on at least one from among the first electronic information and the second electronic information, and outputting the possibility information and the third URL in association with each other, wherein:
when a slash exists in the second URL, said generator means generates URLs that are used as third URLs, said URLs comprising a URL, which is the same as the second URL and comprising a URL that is created by deleting a portion which follows the slash from the second URL,
said outputting means generates the possibility information for each of the third URLs based on the third URL and based on at least one from among the first electronic information and the second electronic information, and outputs the possibility information and the third URL in association with each other, and
when the third URLs include a particular URL which has possibility information indicative of a possibility higher than another third URL and which belongs to the other third URL, said outputting means deletes the other third URL.

9. A link information extracting method performed by a link information extracting apparatus, comprising:
storing a first URL classified into a particular type in a storage unit;
taking in a plurality of pieces of electronic information;
classifying each piece of the taken-in electronic information into first electronic information which describes the first URL in said storage unit or into second electronic information which does not describe the first URL;
generating a third URL based on a second URL when the first electronic information describes the second URL that is different from the first URL; and
generating possibility information indicative of a possibility that the third URL is classified into said particular type, based on the third URL and based on at least one from among the first electronic information and the second electronic information, and outputting the possibility information and the third URL in association with each other, wherein:
when a slash exists in the second URL, said generating the third URL includes generating URLs that are used as third URLs, said URLs comprising a URL, which is the same as the second URL, and comprising a URL that is created by deleting a portion which follows the slash from the second URL, and
said generating the possibility information includes:
generating the possibility information for each of the third URLs based on the third URL and based on at least one from among the first electronic information and the second electronic information,
outputting the possibility information and the third URL in association with each other, and
when the third URLs include a particular URL which has possibility information indicative of a possibility higher than another third URL and which belongs to the other third URL, deleting the other third URL.

10. The link information extracting method according to claim 9, wherein said particular type is a type to which a URL described in a spam blog belongs.

11. A non-transitory computer readable recording medium having a program recorded thereon for causing a computer to execute:
a storing procedure for storing a first URL classified into a particular type in a storage unit;
a take-in procedure for taking in a plurality of pieces of electronic information;
a classifying procedure for classifying each piece of the taken-in electronic information into first electronic information which describes the first URL in said storage unit or into second electronic information which does not describe the first URL;
a generating procedure for generating a third URL based on a second URL when the first electronic information describes the second URL that is different from the first URL; and
an outputting procedure for generating possibility information indicative of a possibility that the third URL is classified into said particular type, based on the third URL and based on at least one from among the first electronic information and the second electronic information, and outputting the possibility information and the third URL in association with each other, wherein:
when a slash exists in the second URL, said generating procedure includes generating URLs that are used as third URLs, said URLs comprising a URL, which is the same as the second URL and comprising a URL that is created by deleting a portion which follows the slash from the second URL, and
said outputting procedure includes:
generating the possibility information for each of the third URLs based on the third URL and based on at least one from among the first electronic information and the second electronic information,
outputting the possibility information and the third URL in association with each other, and
when the third URLs include a particular URL which has possibility information indicative of a possibility higher than another third URL and which belongs to the other third URL, deleting the other third URL.

12. The non-transitory computer readable recording medium according to claim 11, wherein:
said particular type is a type to which a URL, which is described in a spam blog, belongs.

* * * * *